United States Patent [19]

Linhart et al.

[11] Patent Number: 4,465,555

[45] Date of Patent: Aug. 14, 1984

[54] WATER-SOLUBLE POLYMERS OF DI-$C_1$-$C_3$-ALKYLAMINONEOPENTYL (METH)ACRYLATES, AND THEIR USE AS RETENTION AGENTS, DRAINAGE AGENTS AND FLOCCULANTS IN PAPERMAKING

[75] Inventors: Friedrich Linhart, Heidelberg; Juergen Hartmann; Dietmar Jung, both of Ludwigshafen; Heinrich Hartmann; Herbert Spoor, both of Limburgerhof, all of Fed. Rep. of Germany

[73] Assignee: BASF Aktiengesellschaft, Ludwigshafen, Fed. Rep. of Germany

[21] Appl. No.: 385,316

[22] Filed: Jun. 4, 1982

[30] Foreign Application Priority Data

Jun. 19, 1981 [DE] Fed. Rep. of Germany ....... 3124011

[51] Int. Cl.³ .............................................. D21H 3/38
[52] U.S. Cl. ............................... 162/168.2; 162/168.3
[58] Field of Search .......................... 162/168.2, 168.3; 210/734

[56] References Cited

U.S. PATENT DOCUMENTS 3,239,496  3/1966  Jurish ............................... 162/168.2
3,776,892  12/1973  Bleyle ................................. 210/734

*Primary Examiner*—Peter Chin
*Attorney, Agent, or Firm*—Oblon, Fisher, Spivak, McClelland & Maier

[57] ABSTRACT

Water-soluble homopolymers and copolymers of di-$C_1$-$C_3$-alkylaminoneopentyl (meth)acrylates, the homopolymers and copolymers having a K value of from 150 to 300, are used as retention agents, drainage agents and flocculants in papermaking. Increased retention, drainage rate and flocculation are achieved in comparison with the conventional basic polyacrylates.

5 Claims, No Drawings

WATER-SOLUBLE POLYMERS OF DI-$C_1$-$C_3$-ALKYLAMINONEOPENTYL (METH)ACRYLATES, AND THEIR USE AS RETENTION AGENTS, DRAINAGE AGENTS AND FLOCCULANTS IN PAPERMAKING

German Pat. No. 2,432,699 discloses a process for the preparation of sedimentation-stable water-in-oil dispersions of acrylamide polymers in which a water-in-oil emulsion of an aqueous acrylamide solution, which may contain not more than 50% by weight of other water-soluble, ethylenically unsaturated monomers, is polymerized in a hydrophobic organic dispersion medium in the presence of a water-in-oil emulsifier, of from 0.1 to 10% by weight of a wetting agent having an HLB value greater than 10, and of a polymerization initiator. Other suitable water-soluble, ethylenically unsaturated monomers include aminoalcohol esters of acrylic acid or methacrylic acid. The known copolymers are, inter alia, used in papermaking for increasing the retention, drainage rate and flocculation rate. However, the effects which can be achieved with these copolymers are still in need of improvement.

German Laid-Open Application DOS No. 2,934,086 discloses emulsion polymers containing (a) from 5 to 100% by weight of a dialkylaminoneopentyl ester of an ethylenically unsaturated polymerizable carboxylic acid and (b) from 0 to 95% by weight of a water-insoluble or at most slightly water-soluble comonomer, (a) and (b) totaling not less than 90% by weight of the polymer, the remainder of which can be built up from water-soluble comonomer. These emulsion polymers are in the form of an aqueous dispersion, and are used as thickeners for aqueous systems having a pH of less than 7. Where water-soluble dialkylaminoalkyl (meth)acrylate-containing polymers have hitherto been used as flocculants, their effectiveness decreases fairly rapidly if they are in the form of an aqueous solution, and after prolonged storage they become virtually ineffective as flocculants.

It is an object of the present invention to provide water-soluble polymers which, when used as paper assistants, give better retention, drainage rate and flocculation than the conventional acrylamide copolymers.

We have found that this object is achieved, according to the present invention, by water-soluble homopolymers of di-$C_1$-$C_3$-alkylaminoneopentyl (meth)acrylates, and copolymers which contain not less than 5% by weight of di-$C_1$-$C_3$-alkylaminoneopentyl (meth)acrylate as copolymerized units, the homopolymers and copolymers having a K value of from 150 to 300. These homopolymers and copolymers are added to the papermaking stock, and give unexpectedly higher retention, drainage rate and flocculation rate than comparable conventional polymers.

The homopolymers and copolymers can be prepared in a conventional manner by polymerization of the monomers, for example by polymerization in a water-in-oil emulsion by the process disclosed in German Pat. No. 1,089,173 or by the reverse suspension polymerization process disclosed in German Pat. No. 1,081,228, or by solution polymerization in water or precipitation polymerization in an inert organic solvent. All the processes use the conventional polymerization initiators, eg. peroxides, redox catalysts or azo-bis-isobutyronitrile. Homopolymers are prepared by polymerization of neutralized or quaternized di-$C_1$-$C_3$-alkylaminoneopentyl (meth)acrylates (monomers of group (a)) in the absence of other monomers. Copolymers of di-$C_1$-$C_3$-alkylaminoneopentyl acrylates or of di-$C_1$-$C_3$-alkylaminoneopentyl methacrylates contain not less than 5% by weight, preferably from 20 to 80% by weight, of these monomers in neutralized or quaternized form as copolymerized units. $C_1$-$C_3$-Alkyl is methyl, ethyl, n-propyl or isopropyl.

Suitable monomers of group (b) are amides of ethylenically unsaturated $C_3$-$C_5$-carboxylic acids, di-$C_1$-$C_3$-alkylamino-$C_2$-$C_4$-alkyl acrylates and methacrylates and di-$C_1$-$C_3$-alkylamino-$C_2$-$C_4$-alkylene(meth)acrylamides, preferably acrylamide, methacrylamide and aminoalcohol esters of acrylic acid or methacrylic acid, eg. dimethylaminoethyl acrylate, diethylaminoethyl acrylate, dimethylaminoethyl methacrylate, diethylaminopropyl acrylate, diethylaminopropyl methacrylate and dimethylaminobutyl acrylate. The aminoalcohol esters of acrylic acid or methacrylic acid and the di-$C_1$-$C_3$-alkylaminoneopentyl (meth)acrylates are exclusively polymerized in neutralized or quaternized form. Examples of suitable quaternizing agents are alkyl halides, eg. methyl chloride, ethyl chloride, methyl bromide, ethyl bromide, methyl iodide, propyl chloride and butyl chloride, dimethyl sulfate, diethyl sulfate, lauryl chloride, alkylene oxides, such as ethylene oxide and propylene oxide, hydroxyalkyl halides, epihalohydrins, such as epichlorohydrin and epibromohydrin, and benzyl chloride.

Inorganic and organic acids which form salts with the basic monomers, for example sulfuric acid, hydrochloric acid, phosphoric acid, acetic acid, formic acid and adipic acid, can be used for the neutralization.

Other comonomers of group (b) include ethylenically unsaturated carboxylic acids of 3 to 5 carbon atoms, eg. acrylic acid, methacrylic acid, crotonic acid, itaconic acid and fumaric acid, maleic anhydride and acid monomers, such as the alkali metal or ammonium salts of vinylbenzenesulfonic acid, acrylamidopropanesulfonic acid and vinylsulfonic acid.

The copolymers can be modified by the presence of, as copolymerized units, not more than about 20% by weight of monomers of group (c), the percentages by weight of (a), (b) and (c) always totaling 100. Monomers of this group are acrylates and methacrylates of monohydric alcohols of 1 to 12 carbon atoms, acrylonitrile, methacrylonitrile, vinyl esters, eg. vinyl acetate, vinyl propionate and vinyl butyrate, diisobutylene and styrene.

The water-soluble homopolymers of dimethylaminoneopentyl acrylate, and water-soluble copolymers containing, as copolymerized units, (a) from 20 to 80% by weight of dimethylaminoneopentyl acrylate and (b) from 80 to 20% by weight of acrylamide, methacrylamide or dialkylaminoalkyl acrylate or methacrylate are of particular importance in the paper industry. All or some of the acrylamide or methacrylamide in the copolymers can be replaced by the above basic acrylates, eg. diethylaminoethyl acrylate.

The polymerization temperature depends on the particular polymerization initiator used, and can vary within a wide range, for example from 0° to 120° C. As a rule, the polymerization is carried out under atmospheric pressure and at from 20° to 80° C., care being taken that the components are mixed thoroughly. The monomers are virtually completely polymerized. The main polymerization can be followed by post-polymerization in order as far as possible to reduce the residual monomer content of the polymer.

The polymers preferably have molecular weights above 1 million, and they are more closely defined by their Fikentscher K value, which is from 150 to 300, preferably from 170 to 250. The high molecular weight polymers in particular can be used in papermaking as retention agents, drainage agents and flocculants. For this purpose, from 0.005 to 0.5% by weight, preferably from 0.01 to 0.1% by weight, based on the dry fiber, of a copolymer containing the di-$C_1$-$C_3$-alkylaminoneopentyl (meth)acrylate is added to the pulp. The di-$C_1$-$C_3$-aminoneopentyl (meth)acrylates are effective in weakly alkaline, neutral and acid pulp. They can be used in either non-ligneous or ligneous pulps, and are particularly effective retention agents for chalk and kaolin.

In the Examples, parts and percentages are by weight. The K values of the polymers are measured in 5% strength aqueous sodium chloride solution at 25° C. by the method of H. Fikentscher, Cellulosechemie 13 (1932), 58–64 and 71–74; $K = k \cdot 10^3$.

PREPARATION OF THE POLYMERS

I. Preparation of water-in-oil polymer emulsions

General method 220 parts of a mixture of 84% of saturated aliphatic hydrocarbons and 16% of naphthenic hydrocarbons (boiling range from 192° to 254° C.), 35 parts of the reaction product of 1 mole of oleyl glycidyl ether, 1 mole of glycerol and 2 moles of ethylene oxide, and 6 parts of an adduct of 10 moles of ethylene oxide with 1 mole of nonylphenol were mixed in a vessel equipped with a stirrer, thermometer and nitrogen inlet and outlet.

The aqueous monomer phase having the particular composition shown in Table 1 was stirred into this mixture. Nitrogen was passed through the emulsion for 30 minutes, and the emulsion was then heated to 60° C. in the course of 15 minutes. A solution of 0.15 part of 2,2′-azo-bis-isobutyronitrile in a little acetone was then added, and the temperature was kept at from 60° to 65° C. for 2 hours. The same amount of polymerization initiator was then again added and the mixture was postpolymerized at 65° C. for 2 hours. A coagulate-free and sedimentation-stable water-in-oil polymer emulsion was obtained.

The resulting water-in-oil polymer emulsions were used to prepare aqueous polymer solutions by the method disclosed in U.S. Pat. No. 3,624,019 by adding to the emulsions 2% of a nonylphenol which had been reacted with ethylene oxide in a molar ratio of 10:1 and diluting the mixtures with water to a polymer content of 0.25%.

TABLE 1

(a) Monomer phase of the water-in-oil emulsions

| | | 1 | 2 | 3 | 4 | 5 | 6 | 7 |
|---|---|---|---|---|---|---|---|---|
| distilled water | [g] | 369 | 369 | 369 | 369 | 369 | 369 | 369 |
| acrylamide | [g] | 195 | 195 | 195 | 195 | 195 | 195 | 195 |
| 37.5% strength sulfuric acid | [g] | 60 | 60 | 60 | 60 | 60 | 60 | 60 |
| diethyl-amino-ethyl acrylate | [g] | 83 | 74.7 | 58.1 | 41.5 | 24.9 | 8.3 | — |
| dimethyl-amino-neopentyl acrylate | [g] | — | 8.3 | 24.9 | 41.5 | 58.1 | 74.7 | 83 |
| formic acid | [g] | 0.15 | 0.15 | 0.15 | 0.15 | 0.15 | 0.15 | 0.15 |

(b) Composition of the polymers in %

| | I/1 | I/2 | I/3 | I/4 | I/5 | I/6 | I/7 |
|---|---|---|---|---|---|---|---|
| acrylamide | 70 | 70 | 70 | 70 | 70 | 70 | 70 |
| diethylaminoethyl acrylate | 30 | 27 | 21 | 15 | 9 | 3 | 0 |
| dimethylaminoneopentyl acrylate(+) | 0 | 3 | 9 | 15 | 21 | 27 | 30 |
| K value | 197 | 247 | 201 | 217 | 221 | 235 | 216 |

Polymer I/1 = comparative prior art polymer

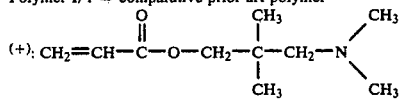

II Pulverulent copolymers

Polymer II/1 is a commercially available pulverulent copolymer of 60% of acrylamide and 40% of diethylaminoethyl acrylate-sulfate and has a K value of 195.

Polymer II/2 was prepared as follows:

114 g of dimethylaminoneopentyl acrylate-sulfate, 170 g of acrylamide and 1 g of formic acid in 280 g of water were brought to pH 3 with sulfuric acid, and 0.57 g of 2,2′-azo-bis-(N,N′-dimethyleneisobutyramidine) dihydrochloride was added. The solution was introduced into a reservoir of 1.6 l of cyclohexane and 5.5 g of protective colloid A from German Laid-Open Application DOS No. 2,710,372 at 60° C. in the course of one hour (protective colloid A was obtained by reacting dicyclopentadiene, maleic anhydride and styrene in an autoclave at 267° C., letting down the mixture and distilling off the volatile constituents). After a further hour at 60° C. and azeotropic removal of the water, a polymer having a K value of 206 (0.1% strength in 5% strength aqueous sodium chloride solution) was obtained.

Use of the polymers

EXAMPLE 1

The effectiveness of the polymer I/7 as a paper assistant in comparison with the prior art polymer I/1 was tested by reference to the Schopper-Riegler freeness and the drainage time.

A ligneous newsprint stock with a pH of 4.8, an alum content of 1.5%, a consistency of 0.2% and a kaolin content of about 12% was used for the Schopper-Riegler freeness test. The drainage time was determined by recording the time required for 700 ml of the stock described above to pass through the Schopper-Riegler apparatus. The drainage time of the assistant-free stock was 97 seconds, and the freeness was 59°SR. These determinations were then carried out on this model stock to which various amounts of polymers I/1 and I/7 had been added. The amounts of the polymers and the results obtained are summarized in Table 2.

TABLE 2

| | Drainage time (seconds) | | | Freeness (°SR) | | |
|---|---|---|---|---|---|---|
| Amount added % | 0.006 | 0.012 | 0.024 | 0.006 | 0.012 | 0.024 |
| Polymer I/1 | 72.4 | 63.4 | 55.0 | 51 | 47 | 44 |
| Polymer I/7 | 63.4 | 53.0 | 41.4 | 48 | 43 | 37 |

EXAMPLE 2

Sheets of paper with a weight per unit area of about 70 g/m² were produced from a neutral stock, comprising 100 parts of sulfate pulp and 50 parts of chalk and having a consistency of 0.2%, with the aid of a Rapid-Köthen sheet-forming apparatus. In the case of the assistant-free stock, the chalk content of the paper was 3.2%. The chalk content of the paper was in each case determined by ashing the sheets. The effectiveness of the polymer I/7 as a retention agent was compared with that of the conventional retention agent polymer I/1. The amounts of the polymers used, based on stock solids, and the results obtained are summarized in Table 3.

TABLE 3

| Polymer | Chalk content when 0.012% | 0.024% of retention agent, based on stock solids, is added |
| --- | --- | --- |
| I/1 | 13.2% | 17.1% |
| I/7 | 18.4% | 21.1% |

EXAMPLE 3

The drainage rate achieved by the polymers given in Table 1 was tested on a model stock with the aid of a Schopper-Riegler apparatus. Ligneous newsprint stock with a pH of 4.8, an alum content of 1.5% and a kaolin content of about 12% was used as the model stock. When no assistant was added to the stock, the drainage time was 95.1 seconds. The drainage times obtained with different amounts, based on stock solids, of the polymers described in Table 1 are given in Table 2.

TABLE 4

| Polymer | Drainage time (seconds) when | | |
| --- | --- | --- | --- |
| | 0.006% | 0.012% | 0.024% |
| | of polymer, based on stock solids, is added | | |
| I/1 | 79.7 | 73.1 | 68.1 |
| I/2 | 70.7 | 64.0 | 55.9 |
| I/3 | 68.5 | 60.0 | 49.1 |
| I/4 | 64.1 | 52.7 | 44.2 |
| I/5 | 61.1 | 51.0 | 42.0 |
| I/6 | 62.4 | 52.0 | 43.0 |
| I/7 | 67.0 | 54.4 | 44.6 |

EXAMPLE 4

Paper having a weight per unit area of about 85 g/m² was produced, without using a retention agent, on a pilot paper machine with a wire width of 80 cm at a constant rate of 80 m/minute from a non-ligneous stock comprising 60 parts of pine sulfate pulp, 40 parts of beech sulfate pulp and 50 parts of chalk. The effect of polymers I/1 and I/7 was then tested. The results are summarized in Table 5.

TABLE 5

| Polymer | Amount added (g/hour) | Weight per unit area (g/m²) | Chalk content (%) | Production (kg/hour) | Polymer consumption (g/tonne) |
| --- | --- | --- | --- | --- | --- |
| — | | 86.4 | 9.4 | 307 | — |
| I/1 (comparison) | 75 | 95.7 | 21.5 | 367 | 204 |
| I/7 (according to the invention) | 75 | 101.5 | 25.1 | 390 | 192 |
| Percentage difference between I/1 and I/7 | 0 | +6 | +16 | +6 | −6 |

EXAMPLE 5

The drainage-accelerating effect of the pulverulent polymers II/1 (comparison) and II/2 (according to the invention) on a ligneous neutral newsprint stock having a density of 0.2% was determined following the method given in Example 1 for determining the drainage time. When no drainage assistant was used, a drainage time of 115 seconds was recorded for this model stock. The drainage times given below were measured when the amounts of polymers II/1 and II/7 given in Table 6 were used:

TABLE 6

| Polymer | Drainage time (seconds) when | | |
| --- | --- | --- | --- |
| | 0.01% | 0.02% | 0.04% |
| | of polymer, based on stock solids, was added | | |
| II/1 (comparison) | 83.6 | 70.3 | 54.4 |
| II/2 (according to the invention) | 78.3 | 57.9 | 42.3 |

EXAMPLE 6

Example 5 was carried out using a ligneous newsprint stock with a pH of 4.5, an alum content of 1.5% and a consistency of 0.2%. When no drainage assistant was used, the drainage time was 105.3 seconds. The drainage times for polymers II/1 and II/2 are given in Table 7.

TABLE 7

| Polymer | Drainage time (seconds) when | | |
| --- | --- | --- | --- |
| | 0.01% | 0.02% | 0.04% |
| | of polymer, based on stock solids, was added | | |
| II/1 | 71.4 | 64.9 | 54.8 |
| II/2 | 56.5 | 47.1 | 36.3 |

EXAMPLE 7

Sheets of paper having a weight per unit area of about 65 g/m² were produced from a stock comprising 80% of bleached sulfite pulp and 20% of kaolin and having a pH of 4.8 and an alum content of 1.5%, with the aid of a Rapid-Köthen sheet-forming apparatus. The ash content of the sheets of paper obtained in the absence of a retention agent was 5.3%. The ash contents given in Table 8 were found when the prior art polymer II/1 and the polymer II/2 according to the invention were used.

TABLE 8

| Polymer | Ash contents (%) when | | |
| --- | --- | --- | --- |
| | 0.01% | 0.02% | 0.09% |
| | of retention agent, based on stock solids, was added | | |
| II/1 | 9.8 | 11.7 | 12.9 |
| II/2 | 10.6 | 12.7 | 14.1 |

EXAMPLE 8

The flocculating effect of the polymers was determined by treating a stock, which had a high content of finely divided solids and contained 1 g of sulfite pulp and 0.25 g of kaolin per liter, with various amounts of polymers II/1 and II/2. The suspension was stirred and allowed to settle, and the transparency of the supernatant clear water was determined photometrically in each case. The results are summarized in the Table.

TABLE 9

| pH | about 7 | | 6/0.5% of alum | |
|---|---|---|---|---|
| amounts added (ppm) | 0.25 | 0.5 | 0.125 | 0.25 |
| | transparency (%) | | | |
| II/1 | 61 | 72 | 43 | 65 |
| II/2 | 75 | 80 | 64 | 80 |
| no flocculant | .20 | | 32 | |

We claim:

1. In a process for the manufacture of paper wherein the improvement comprises adding to the paper making stock as a retention agent, a drainage agent and a flocculant, a water-soluble copolymer having a K value of from about 150 to about 300, which copolymer is prepared by polymerizing a. not less than 5% by weight of a neutralized or quaternized di-$C_1$–$C_3$-alkylaminoneopentyl acrylate or methacrylate, with
   b. about 5% to about 95% by weight of a water-soluble copolymerizable ethylenically unsaturated monomer or monomers selected from
      i. 0 to about 27% by weight of di-$C_1$–$C_3$-alkylamino-$C_2$–$C_4$-alkylacrylate or methacrylate and
      ii. about 95% to about 5% by weight of acrylamide or methacrylamide.

2. The process according to claim 1, wherein the amount of monomer a ranges from about 20% to about 80% by weight and the amount of the monomer mixture b ranges from about 80% to about 20% by weight based on the total mixture.

3. The process according to claim 1, wherein said di-$C_1$–$C_3$-alkylamino-$C_2$–$C_4$-alkylacrylate is diethyl amino ethylacrylate and said other b monomer is acrylamide.

4. The process according to claim 1, wherein said K value is 200 to 300.

5. The process according to claim 1, wherein said water-soluble copolymer is derived by polymerizing 30% by weight of dimethylaminoneopentyl acrylate with 70% by weight of acrylamide.

* * * * *